(12) United States Patent
Dawant et al.

(10) Patent No.: US 12,197,513 B2
(45) Date of Patent: Jan. 14, 2025

(54) METHOD FOR EXTRACTING DATA ASSOCIATED WITH A VIEW OF AN APPLICATION, A RELATED ANALYSIS DEVICE AND A RELATED MOBILE COMPUTING DEVICE

(71) Applicant: UNIVERSITE LIBRE DE BRUXELLES, Brussels (BE)

(72) Inventors: Michaël Mansour Dawant, Brussels (BE); Achraf Ait El Hadj, Liedekerke (BE)

(73) Assignee: UNIVERSITE LIBRE DE BRUXELLES (BE)

( * ) Notice: Subject to any disclaimer, the term of this patent is extended or adjusted under 35 U.S.C. 154(b) by 286 days.

(21) Appl. No.: 17/786,365

(22) PCT Filed: Dec. 16, 2020

(86) PCT No.: PCT/EP2020/086438
§ 371 (c)(1),
(2) Date: Jun. 16, 2022

(87) PCT Pub. No.: WO2021/122760
PCT Pub. Date: Jun. 24, 2021

(65) Prior Publication Data
US 2023/0019188 A1    Jan. 19, 2023

(30) Foreign Application Priority Data
Dec. 18, 2019  (EP) ..................................... 19217642

(51) Int. Cl.
*G06F 16/904*  (2019.01)
*G06F 16/906*  (2019.01)
(Continued)

(52) U.S. Cl.
CPC .......... *G06F 16/904* (2019.01); *G06F 16/906* (2019.01); *G06F 16/907* (2019.01); *G06F 21/6218* (2013.01)

(58) Field of Classification Search
CPC .... G06F 16/904; G06F 16/907; G06F 16/906; G06F 21/6218
See application file for complete search history.

(56) References Cited

U.S. PATENT DOCUMENTS 8,046,438 B2 * 10/2011 Martinez ............... G06F 16/958
                                                           715/239
9,009,292 B2 *  4/2015 Ho ......................... H04L 67/56
                                                           709/224

(Continued)

FOREIGN PATENT DOCUMENTS

EP    3265933 A1    1/2018

OTHER PUBLICATIONS

International Search Report for PCT Application No. PCT/EP2020/086438, dated Feb. 12, 2021, 3 pages.

*Primary Examiner* — Robert W Beausoliel, Jr.
*Assistant Examiner* — Susan F Rayyan
(74) *Attorney, Agent, or Firm* — Dickinson Wright PLLC (57) ABSTRACT

This disclosure relates to extracting data associated with a view of an application from a plurality of applications, said application being executed by a mobile computing device and said view being displayed at a display wherein said method comprises the steps of retrieving a variable data set associated with said view of said application from a memory of said mobile computing device, said variable data set comprising at least one data element, said at least one data element of said variable data set characterizes said view of said application and assigning a cluster to each of said at least one data element of said variable data set based on said variable type, said variable with corresponding value and a (Continued)

predefined set of clusters and determining the type of application based on said cluster assigned to each of said at least one data element of said variable data set.

17 Claims, 2 Drawing Sheets

(51) Int. Cl.
*G06F 16/907* (2019.01)
*G06F 21/62* (2013.01)

(56) References Cited

U.S. PATENT DOCUMENTS

| | | | |
|---|---|---|---|
| 10,303,892 B1* | 5/2019 | Lim | H04L 67/02 |
| 10,558,950 B2* | 2/2020 | Anima | G06Q 10/107 |
| 2006/0161531 A1* | 7/2006 | Khandelwal | G06F 16/90335 |
| | | | 707/E17.14 |
| 2008/0228806 A1* | 9/2008 | Davies | H04L 67/02 |
| | | | 707/999.102 |
| 2009/0036102 A1* | 2/2009 | Ho | H04L 67/306 |
| | | | 455/412.2 |
| 2012/0174007 A1* | 7/2012 | Lee | G06F 3/04817 |
| | | | 715/765 |
| 2012/0311465 A1* | 12/2012 | Nealer | H04L 9/40 |
| | | | 715/760 |
| 2014/0006418 A1* | 1/2014 | Forte | G06F 16/9535 |
| | | | 707/748 |
| 2014/0181751 A1* | 6/2014 | Won | G06F 3/04817 |
| | | | 715/835 |
| 2016/0335328 A1* | 11/2016 | Lampert | G06F 16/00 |
| 2018/0330329 A1* | 11/2018 | Anima | G06F 16/48 |
| 2018/0349365 A1* | 12/2018 | McRaven | G06F 16/908 |
| 2019/0005137 A1* | 1/2019 | Gupta | G06Q 30/0255 |
| 2019/0297478 A1* | 9/2019 | Langlois | B60K 35/10 |
| 2021/0117174 A1* | 4/2021 | Worsnop | G06V 30/153 |
| 2021/0357966 A1* | 11/2021 | Michel | G06Q 20/3267 |

* cited by examiner

METHOD FOR EXTRACTING DATA ASSOCIATED WITH A VIEW OF AN APPLICATION, A RELATED ANALYSIS DEVICE AND A RELATED MOBILE COMPUTING DEVICE

CROSS-REFERENCE TO RELATED APPLICATION(S)

This present application is a national stage application of International Patent Application No. PCT/EP2020/086438, filed Dec. 16, 2020, which claims priority to European Patent Application No. 19217642.8, filed Dec. 18, 2019, the disclosures of which are hereby incorporated by reference herein.

TECHNICAL FIELD

Embodiments of the present invention relate to a method for extracting data from a view of an application being presented at display of a mobile device, a related analysis device and a mobile computing device.

BACKGROUND ART

In the past, search engines were the entry point of the computer user's digital experience wherein, the context was easy to capture, as this context was provided by the user by means of the keywords of the user's search request. Users suggested and guided the context by using keywords in a search engine. As a consequence, when using a search engine, the advertisements to which such user is exposed are necessarily contextualized based on the keywords used.

Currently, however this use of the computer, e.g. laptops and desktops is shifting into a direction wherein mobile devices such as tablets and/or smartphones take a more dominant place. As a consequence, the method of interaction has changed: the way content is accessed through keywords and search engines has evolved into a direction wherein content is accessed through a plurality of dedicated and specialized applications instead of the use of keywords in search engine.

Such a plurality of applications, further referred to as "apps", may include all kinds of types of applications, each with a corresponding purpose and characteristics, such as apps for reading the news, chat-apps, mail apps, browser-apps, travel-planner apps, banking apps etc.

A mobile device, such as for instance a smart phone or a tablet computer typically comprises a display for presenting such a plurality of apps on the screen or display where each app of the plurality of applications, typically is presented by means of an icon corresponding to the application. Such application, at selection of the application by a user of the mobile device, is opened and displayed at the full screen or a substantial part thereof, which is called a view of an application.

Examples of such applications are iOS apps being installed at an iPhone or iPad or Android apps being executed at an Android device like Android smartphone or tablet.

While using these applications at such a mobile computing device the experience is more "passive" as the user is exposed to content only by selection of a certain application which the user does not initialize as much explicitly as in a search engine request using the keywords for expressing the context and exposed to a context but determining the nature of this context in case of such applications is much more difficult especially given the heterogeneity of the nature and architecture of each application.

The derivation of such context in such system comprising a plurality of applications is more complicated in implementation of mobile applications due to the context of the applications which is much more heterogeneous, and also more "passive" as the content is not guided by keywords and hence less predictable in such environment. Moreover, it becomes more and more difficult to reconcile with growing concerns about privacy (RGPD, hardening of the rules framing access to data on platforms such as iOS).

Disclosure of the Invention

An object of embodiments of the present invention is to provide a method for extracting data from a view of an application being displayed at a display of a mobile computing device, a related analysis device and related mobile computing device of the above known type but wherein the aforementioned shortcoming or drawbacks of the known solutions are alleviated or overcome.

Accordingly, embodiments of the present invention relate to a method for extracting data associated with a view of an application from a plurality of applications, said application being executed by a mobile computing device and said view of said application being displayed at a display (13) of said mobile computing device (1), wherein said method comprises the steps of:

retrieving a variable data set associated with said view of said application from a memory of said mobile computing device, said variable data set comprising at least one data element being defined by a variable type and a variable with a corresponding value, said at least one data element of said variable data set characterizes said view of said application; and assigning a cluster to each of said at least one data element of said variable data set based on said variable type, said variable with corresponding value and a predefined set of clusters; and determining the type of application based on said cluster assigned to each of said at least one data element of said variable data set.

Another embodiment of the present invention relates to method for extracting data from a view of an application, according to claim 1, characterized in that said method further comprises the step of:

determining a strategy for analyzing the content of said view of said application based on said type of application.

Still another embodiment of the present invention relates to a method for extracting data from a view of an application, according to claim 2, characterized in that said method further comprises the step of:

determining information on said context on said view of said application based on said strategy for analyzing the content of said view of said application.

A further relevant embodiment relates to a method for extracting data from a view of an application according to claim 1 or 2, characterized in that said method further comprises the step of:

retrieving meta-information associated with said application corresponding to said view.

A subsequent embodiment of the present invention relates to a method for extracting data from a view of an application, according to claim 2 or 3, characterized in that said method further comprises the step of:

Collecting context information on said view of said application optionally including at least one of said type of application determined and meta-information associated with said application retrieved.

Another embodiment of the present invention relates to a method for extracting data from a view of an application, according to claim 5, characterized in that said method further comprises the step of:

Applying privacy rules on said context information on said view of said application optionally including at least one of said type of application determined and meta-information associated with said application retrieved.

A further embodiment of the present invention relates to a method for extracting data from a view of an application, according to any of claims 3 to 6, characterized in that said method further comprises the step of:

forwarding said context information on said application corresponding to said view to a server device that is configured to determine alternative contentment based on said context information on said application corresponding to said view.

Still a further embodiment of the present invention relates to a method for extracting data from a view of an application, according to claim 1, characterized in that said predefined set of clusters is based on said type of applications of said plurality of applications being viewed.

A further embodiment of the present invention relates to an Analysis Device (15) for extracting data associated with a view of an application from a plurality of applications said application being executed by a mobile computing device (1) and said view of said application being displayed at a display (13) of said mobile computing device (1), wherein said analysis device comprises means (12) configured to:

retrieve a variable data set associated with said view of said application from a memory of said mobile device, said variable data set comprising at least one data element being defined by a variable type and a variable with a corresponding value, said at least one data element of said variable data set characterizes said view of said application; and assign a cluster to each of said at least one data element of said of said variable data set based on said variable type, said variable with corresponding value and a predefined set of clusters; and determine the type of application based on said cluster assigned to each of said at least one data element of said of said variable data set.

A further embodiment of the present invention relates to an Analysis Device (15) for extracting data associated with a view of an application according to claim 9, characterized in that said analysis device further comprises means configured to forward said context information on said application corresponding to said view to a server device that is configured to determine alternative content based on said context information on said application corresponding to said view.

Another embodiment of the present invention relates to a Mobile computing device (1) for extracting data associated with a view of an application from a plurality of applications said application being executed by said mobile device (1) and said view of said application being displayed at a display (DP) of said mobile computing device (1), characterized in that said mobile computing device (1) further comprises an analysis device (15) according to claim 9.

Indeed this objective is achieved by first retrieving a variable data set associated with said view of said application from a memory of said mobile computing device, where said variable data set comprises at least one data element where each data element is defined by a variable type and a variable with a corresponding value and wherein the at least one data element of said variable data set characterizes said view of said application. Subsequently, said at least one data element of said of said variable data set is assigned to a cluster based on said variable type, said variable with a corresponding value and a predefined set of clusters and successively the type of application is determined based on said cluster assigned to each of said at least one data element of said of said variable data set.

In other words, in this way a variable data set that is associated with the view of said application currently being executed, is retrieved from a memory of said mobile computing device, where such variable data set comprises at least one data element, where each data element is defined by a variable type and a variable with a corresponding value and wherein the at least one data element of said variable data set characterizes said view of said application meaning that the content that is displayed in this view of the concerned application is defined by this at least one data element.

Subsequently, said at least one data element of said of said variable data set is assigned to a cluster based on said variable type, said variable with corresponding value and a predefined set of clusters and successively the type of application is determined based on said cluster assigned to each of said at least one data element of said of said variable data set.

It is to be noted that the view of the application is defined as the view of the application at startup of the application as initiated by the selecting of the meant application. A selection of a subsequent link within this view of this application initiates a new subsequent view of the application. The view of a chat application for instance may include the sequence of text sent to a person involved in a chat and a subsequent response from another party involved where this sequence of messages and responses together constitute one single view. Otherwise, in case of a newspaper app the view constitutes a set of articles, each with a different topic where each such article with a certain topic comprises a link to further more detailed information concerning this topic. Such link to further more detailed information concerning this topic leads to a new distinct view, where at selection of the link a new view is opened containing the more detailed information concerning this topic.

A further relevant embodiment relates to the method for extracting data from a view of an application wherein this method further comprises the step of determining a strategy for analyzing the content of said view of said application based on said type of application.

Based on the determination of the type of application a dedicated strategy for analyzing the content of the view may be applied where this dedicated strategy is optimum adapted to the specific content expected for this type of application.

A subsequent analysis of the content of a chat-application requires a completely different strategy from the analysis of a newspaper application or the analysis of even still another type of application, for determining the context of such view of this application.

As a chat application typically comprises a plurality of messages potentially expressing emotions giving context information e.g. on the involved parties or other topics, the text of all messages can be analyzed to determine context information such as the emotional content of the discussion (positive, negative, . . . ), a general category to which the discussion relates (Car, Travel, . . . ) as well as keywords (Florida, Audi, . . . ) etc.

Contrary to such a chat application, in case of a newspaper application there is no user text that can be analyzed for determination a context of a user. In case of such newspaper application the emotion of the user with respect to the respective article could be determined by analyzing the text of the article for determining the content of the article and furthermore based on the time the user is viewing the article determine the emotion of the user with respect to the content of the respective article.

It is clear from the former examples of applications that based on the type of application a different strategy may be necessary for determining the context.

The basic idea of these strategies is that our technology creates value by analyzing the content that is associated with a view. This analysis of this content involves various natural language processing methods such as sentiment analysis, categorization, etc. This semantic analysis allows us, for example in the case of the application of news, to analyze the nature of certain adjectives in the article's text to determine the emotional content of its content. It also allows us at first to associate the text of the article with a generic category: politics, economics etc. Beyond semantic analysis, we can also extract keywords from the text: Boris Johnson, Brexit, etc.

However, to do this we must first determine the relevant part of the text to which the semantic analysis relates. In the case of the current application, this involves analyzing the text of the article including the actual content of the article and hence not considering the text containing the author's name or publication date or a generic text unrelated to the content of the article consulted by the user.

Similarly, in case of an instant messaging application, it is a question of analyzing the text of the last messages and not the text containing the time and date of the message or the names of the various in the chat involved correspondents.

In order to select the context of the application the relevant text is to determine by means of a strategy dedicated to each type of application. In case of a newspaper application an analysis is performed on only the three longest texts fragments (i.e. those with the most characters) and then, on the basis of these first results, to restrict the analysis to a single text.

In the case of an instant messaging application, the strategy is different, as it only consists of analyzing only the text of variables that contain at least 80% text characters (to avoid elements describing dates or times) and whose text variance is, between two refresh steps, greater than a threshold value (to avoid generic elements such as a user name, . . . )

In this way the dedicated strategy for analyzing the content of sais view of the subject application is tailored to the type of application by optimum selecting the relevant information based on which the context can be determined.

Another relevant embodiment is that the method for extracting data from a view of an application further comprises the step of retrieving meta-information associated with said application corresponding to said view where the retrieved meta-information even better characterizes the application and the context thereof. This metadata may include information such as: the language of the user's system, the location of the user, the time of arrival and departure on the view of the application.

This meta-data as an example may allow for instance various applications: such as serving contextualized advertising in Dutch to a Dutch-speaking user and in French to a French-speaking user, as part of an analysis solution the arrival/departure times allow to determine the time spent on a view according to the context (keywords, values, categories, or emotional content).

A further relevant embodiment is that the method for extracting data from a view of an application, is that context information on said view of said application including at least one of said type of application determined and meta-information associated with said application retrieved is collected which context information can be applied for putting the context of the view of the application into a certain perspective and could for example be applied in content suggestion for this respective user, in identifying particular information (sources) that could be of relevance for the particular user while basing on the earlier determined context information and for subsequent referral to this particular identified information (sources).

Alternatively, or as an example, this information could be applicable as well in the field of advertising, the emotion that the context conveys is of particular value Imagine that a user is exposed to content dealing with the autonomy constraints of electric vehicles. Our technology is able to associate, to this content, a category (the automobile) of keywords (autonomy . . . ) and an emotion (negative). This is for instance to allow an automobile firm such as BMW to calibrate its advertising message by offering ads, e.g. to change the opinion, emotion, related to its improved range of hybrid cars or proving its fast charging system. The contextual analysis allows to capitalize on the context of an application to generate growth or increase retention of a user base. The concept automatically identifies the emotion, keywords, category or value taken by the content of a particular view, or variable and determines how these factors affect the user's behavior (for example: what context does lead the user to leave a view of an application and moving to another).

The contextual analysis by means of the analysis device then offers means to react, for example by changing the value of a variable or by sending separate notifications to user groups with common reactions to a given context).

Hence it is facilitated to capitalize on the context information on a view of an application which is gathered to indicate that reading an article with a negative emotional content in the political category with the key "brexit" was likely to cause an abandonment rate (or a commitment rate such as time spent on a view) 30% higher than the average. This analysis can also be completed by the meta-data described above: The abandonment rate following the visualization of the target content described above (negative article on Brexit) increases by 35% in Brussels but only by 20% in Antwerp, . . . )

Another embodiment is that privacy rules may be applied to the context information on said view of said application optionally including at least one of said type of application determined and meta-information associated with said application retrieved. Applying such privacy rules may include filtering the context information and results that are based on this context information in so far that privacy of the user computing device is respected.

A still further relevant embodiment is that the method and related devices for extracting data from a view of an application, further comprises the step of forwarding said context information on said application corresponding to said view to a server device that is configured to determine alternative contentment based on said context information on said application corresponding to said view.

Another embodiment is that the predefined set of clusters is based on the various type of applications of the plurality of applications that are being viewed.

The number of clusters is a finite number. This is related to the fact that each cluster has an analysis scenario that is designed for a set of similar situations. The number of clusters is determined according to the level of granularity required by market conditions.

As an alternative, the user computing device may alternatively, be configured to base on the context information on said application corresponding to said view to determine alternative content that is based on said context information on said application corresponding to said view.

The receiving server is configured to, based on said context information on said view of said application, optionally including at least one of said type of application determined and meta-information associated with said application retrieved is collected, identify particular alternative information (sources) that could be of relevance for the particular user while for subsequent referral to this particular identified information (sources).

Alternatively, or as an example, this information could be applicable as well in the field of advertising, the emotion that the context conveys is of particular value Imagine that a user is exposed to content dealing with the autonomy constraints of electric vehicles. Our technology is able to associate, to this content, a category (the automobile) of keywords (autonomy . . . ) and an emotion (negative). This is for instance to allow an automobile firm such as BMW to calibrate its advertising message by offering ads, e.g. to change the opinion, emotion, related to its improved range of hybrid cars or proving its fast charging system.

BRIEF DESCRIPTION OF THE DRAWINGS

The invention will be further elucidated by means of the following description and the appended figures.

MODES FOR CARRYING OUT THE INVENTION

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Figure 1:
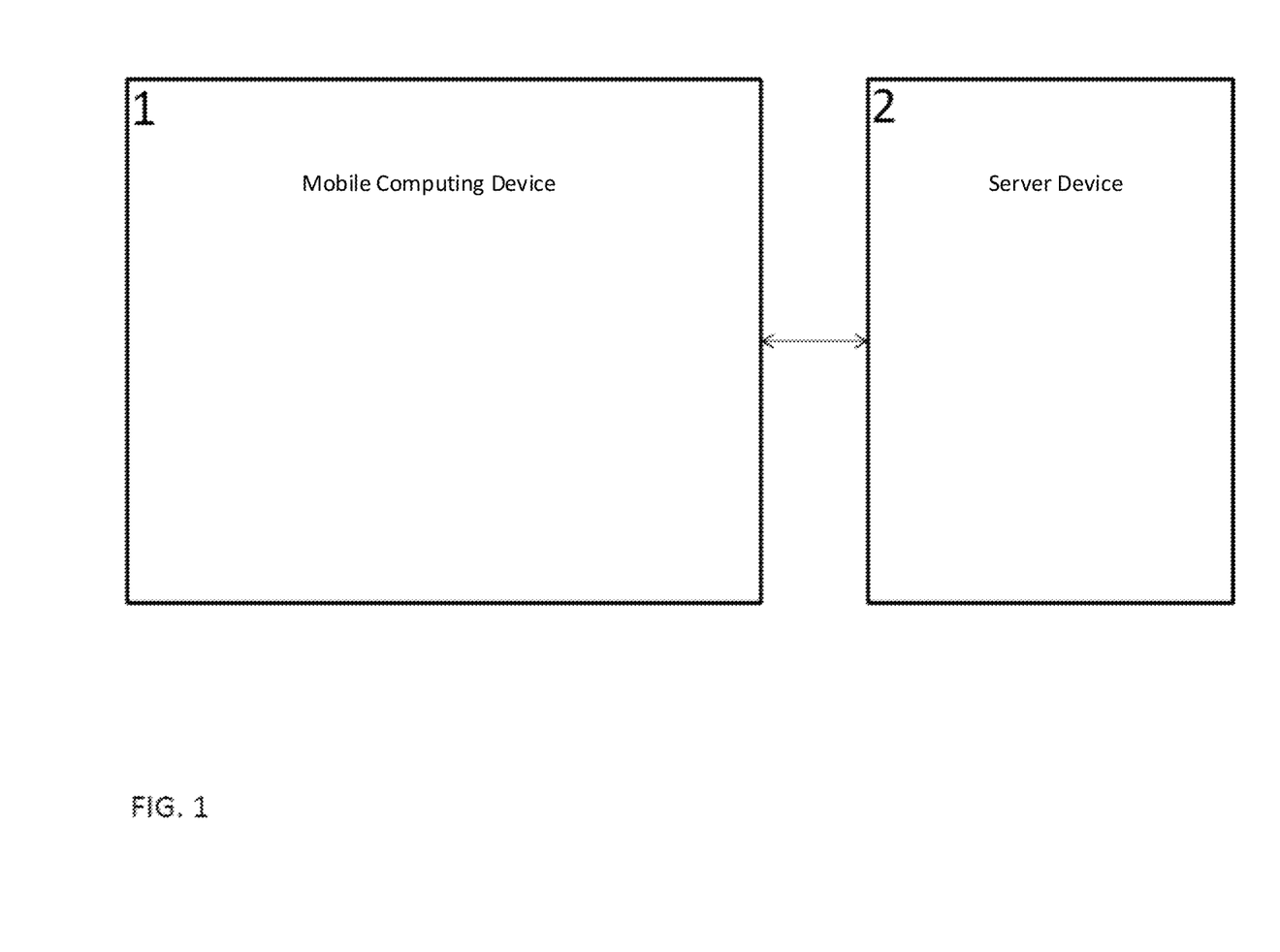
FIG. 1 represents a system for extracting data associated with a view of an application consisting of a Mobile computing device 1 and a server device 2.
Figure 2:
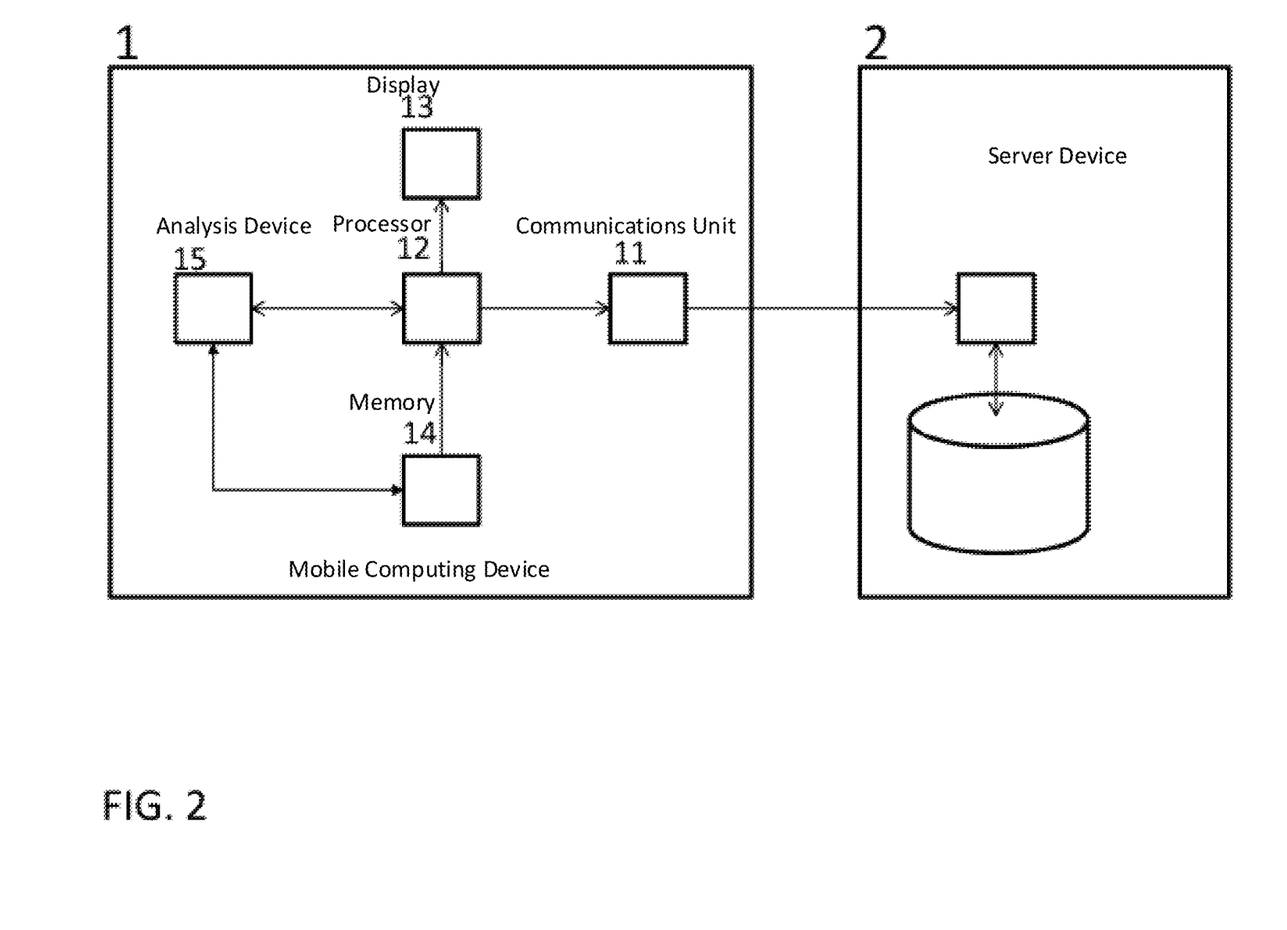
FIG. 2 represents the functional elements of the mobile computing device 1 with the analysis device according to embodiments of the present invention.

In the following paragraphs, referring to the drawing in FIG. 1, an implementation of the system for extracting data associated with a view of an application according to an embodiment of the present invention is described. In a further paragraph, all connections between mentioned elements are defined. Subsequently all relevant functional means of the system for extracting data associated with a view of an application as presented in FIG. 2 are described followed by a description of all interconnections.

In the succeeding paragraph the actual execution of the extracting data associated with the view of an application according to an embodiment of the present invention is described under control of the system is described. A first essential element of the system is a mobile computing device 1 such as an iPhone, an iPad, or Android devices such as an Android smartphone or Android tablet computer. Such a mobile computing device is configured to install a multiplicity of different kind of applications where the execution of each such application is meant for performing a different kind of task. Such a plurality of applications, further referred to as "apps", may include all kinds of types of applications, each with a corresponding purpose and characteristics, such as apps for reading the news, chat-apps, mail apps, browser-apps, travel-planner apps, banking apps etc.

The mobile computing device, such as for instance a smart phone or a tablet computer typically comprises a display for presenting such a plurality of apps on the screen or display where each app of the plurality of applications, typically is presented by means of an icon corresponding to the application. Such application, at selection of the application by a user of the mobile device, is opened and displayed at the full screen or a substantial part thereof, which is called a view of an application.

Examples of such applications are iOS apps being installed at an iPhone or iPad or Android apps being executed at an Android device like Android smartphone or tablet.

While using these applications at such a mobile device the experience is more "passive" as the user is exposed to content only by selection of a certain application which the user does not initialize as much explicitly as in a search engine request using the keywords for expressing the context and exposed to a context but determining the nature of this context in case of such applications is much more difficult especially given the heterogeneity of the nature and architecture of each application.

Further, the system may consist of a server device 2 that may be a web server device or alternatively a local or distributed server that is configured to determine alternative contentment based on said context information on said application corresponding to said view.

Such mobile communications device 1 and the web server device 2 may be coupled over a wireless connection such as wireless networks include cell phone networks, wireless local area networks (WLANs), wireless sensor networks, satellite communication networks or any alternative suitable communications networks.

The mobile computing device 1 may comprise a display 13 for presenting such a plurality of apps on the screen or display where each application of the plurality of applications, typically is presented by means of an icon corresponding to the application. Such application, at selection of the application by a user of the mobile device, is opened and displayed at the full screen or a substantial part thereof, which is called a view of an application. The mobile computing device 1 further comprises a communications means 11 which typically implements the wireless communication such as the voice communication and the data communication via cell phone networks (3G, 4G, 5G etc, wireless local area networks (WLANs) and a memory means 14 that is configured to store the apps and amongst other may comprise a part of random access memory for storing temporary data while executing the apps. This temporary data may comprise all variables that define a view of such application being executed.

Further, the mobile computing device 1 may comprise processing means 12 for actually executing an application and processing all relevant data.

Furthermore, the mobile computing device 1 may comprise an analysis device 15 that is configured to extract data that is associated with a view of an application from a plurality of applications said application being executed by a mobile computing device (1) where this view of said application being displayed at a display 13 of the mobile computing device 1.

The analysis device 15 further comprises:

means which are configured to retrieve a variable data set associated with said view of said application from a memory of said mobile device, said variable data set comprising at least one data element being defined by a variable type and a variable with a corresponding value, said at least one data element of said variable data set characterizes said view of said application; and means configured to assign a cluster to each of said at least one data element of said of said variable data set based on said variable type, said variable with corresponding value and a predefined set of clusters; and means configured to determine the type of application based on said cluster assigned to each of said at least one data element of said of said variable data set.

In an alternative embodiment, the analysis device 15 could be implemented remote from the mobile computing device 1 in a remote distinct network element or device.

In the succeeding paragraph the actual execution of the extracting data that is associated with a view of an application according to an embodiment of the present invention is described.

In order to explain an embodiment of the present invention it is assumed that the user of the mobile computing device 1 for instance is chatting with a second person using a chat application like Whatsapp, Facebook Messenger, or any other instant messaging application.

In parallel this user has opened the newspaper application providing this user with an overview on news articles.

It is further assumed that the user switches back and forth between the view of the chat or instant messaging application and the view of the newspaper application. The user may keep some further applications active as well in the background like a weather app the stock exchange app and others.

At selection of such application active in the background the application view is presented at the screen.

The analysis device 15, retrieves the variable data set associated with said view of the chat application, when this application is being selected and used, from the random access memory 14 of said mobile computing device 1. In parallel or sequentially this user views the newspaper application.

Similarly, at selection and each subsequent use, the analysis device 15, additionally retrieves the variable data set associated with said view of the newspaper application, from the random access memory 14 of said mobile computing device 1.

Hence the variable datasets corresponding to each view of the Chat/Instant messaging application and the newspaper application are fetched from the random access memory 14 of the mobile computing device. All these variable data sets are maintained the random access memory part of memory 14 during the period each of the mentioned applications is active.

The variable data set corresponding to the chat application may consist of variable type text variable "last message".

In the case of an instant messaging application, a view may include the below mentioned variables types (which is neither an exhaustive nor a limiting list):

buttons with a text associated with these buttons which text will be analyzed for determination of context related to the view (where the content of the text is value of the variable);

images in which case the image file associated with these will be analyzed for determination of context related to the view (where the content of the image is value of the variable)

views, in which case the user's position in the view (in terms of scrolling . . . ) will be analyzed for determination of context related to the view;

labels, in which case the text associated with these labels will be analyzed for determination of context related to the view.

In the context of a news application, the button can be a category to add to the home feed, the image may be an illustration of the article, the label can be the title of the article. The view can be a text view with the content of the article.

In case of a chat/instant messaging application the variability of the content of the variables (z) is high and where the number of type (x) is low probably corresponds to an instant messaging application, in an animated conversation, the variable "last" message changes all the time, while the view is on the screen. The type of variable is, on the other hand, relatively homogeneous, it is once again mainly text.

The variable data set corresponding to the newspaper application may consist of variable below mentioned type text variable "author", "title".

In the case of a newspaper application, a view of the application may include the below mentioned variables types (which is neither an exhaustive nor a limiting list):

buttons with a text associated with these buttons, the text associated with these buttons will be analyzed for determination of context related to the view (where the content of the image is value of the variable);

images, in which case the image file associated with these will be analyzed for determination of context related to the view (where the content of the image is value of the variable);

views, in which case the user's position in the view (in terms of scrolling . . . ) will be analyzed for determination of context related to the view;

labels, in which case the text associated with these labels will be analyzed for determination of context related to the view.

In case of an instant messaging application, the button may be a button to send a message, attach an attachment etc. The image may consist of content shared by the user with a contact. The view can consist of a discussion bubble.

As we have seen, the "dataset" are relatively similar, however the occurrence of certain types, the variability and nature of certain values are not similar and hence is characteristic of an application family or the nature of a particular view.

In addition, some types may seem relatively uninteresting in some scenarios while they carry "insights" in others. For example, a button whose text indicates a price or delivery time as part of a home delivery app may be of contextual relevance.

It is to be noted that the procedure for retrieving the variable data set associated with a view of said application as displayed on the screen is performed for the first time immediately after loading the view. However, this retrieving may be performed several times during the view of the application: e.g. quickly after the launch, to determine the variability (a) of the content of the variables (b) of the number of variables (example: a messaging app or the number of "text messages" variables increases over time) and for instance once each further time-interval.

For example in case of the newspaper application the variability of the content of the variables (z) is very low and or the number of types (x) is also low. This group probably corresponds to a newspaper app: after loading the article, the variables do not change; the title remains the same, the author also and it is very unlikely to observe an update of the text being read. Also, the variables are not very diverse, they are mainly texts. Based on the retrieved variable data set first corresponding to the view of the chat/instant messaging application the elements of the data set i.e. the variable types with corresponding variables and their values may be represented in a 3-dimensional point cloud. (these 3 dimensions may be: x: the number of distinct variable types on the view, y: the number of variables on the view, z: the variability of the content (and the number of variables but to make it simple and visual, let's stay at 3 dimensions) of the variables present on the view).

Subsequently, the means that is configured to assign a cluster to each of said at least one data element of said variable data set based on said variable type, said variable with corresponding value and a predefined set of clusters hence, based on the values of the variable data set (i.e. the variable type, the variables and corresponding values) performs the clustering that can be performed using various methods such for example by means of the known Kanion clustering method.

By means of clustering, the variable types and variable values are grouped in clusters which are predefined. For example, when it is determined that the variable type is text and the value is frequently changing, it is determined that the application is probably a chat app and the variable information is grouped in the cluster for chat view information. All data from a number of variable types and variable values grouped together in a cluster is called cluster data.

At this point in the method, three parameters are known for each variable information: cluster, variable type, and variable value In an example this clustering may be performed on the earlier described point cloud. The basic idea of these clustering methods is to create groups in which the distance between the different points included in the cluster is as small as possible (i.e. the points of the same cluster will have similar x,y,z variables.

Using such clustering methods we therefore find ourselves with different groups in which the variables x,y,z as earlier mentioned are homogeneous.

For example, a group wherein the variability of the content of the variables (z) is very low and or the number of types (x) is also low. This group probably corresponds to a newspaper app: after loading the article, the variables do not change; the title remains the same, the author also and it is very unlikely to observe an update of the text being read. Also, the variables are not very diverse, they are mainly texts.

A group where the variability of the content of the variables (z) is high and where the number of types (x) is low probably corresponds to a chat or instant messaging application, while in an animated conversation, the variable "last" message changes all the time, while the view is on the screen. The type of variable is, on the other hand, relatively homogeneous, it is once again mainly text.

A further case where z is low, but x is high can be a meal delivery app. The card of a restaurant does not change after being displayed on your screen, but you have a multitude of variables: photos, a text field to give your opinion, a map showing the location of the restaurant, perhaps a button to book.

Subsequently, based on the assigned cluster that corresponds to each of said at least one data element of said variable data set the type of application is determined.

Based on the cluster assignment of the first application it is determined based on the earlier described characteristics of the variable data set corresponding to the view of the application that the application can be characterized as a chat/instant messaging app.

For the second application it is determined based on the earlier described characteristics of the variable data set corresponding to the view of the application that the application can be characterized as a newspaper application.

Now based on the type of application as determined a distinct strategy for analyzing the content of said view of said application can be determined.

Based on the determination of the type of application a dedicated strategy for analyzing the content of the view may be applied where this dedicated strategy is optimum adapted to the specific content expected for this type of application.

A subsequent analysis of the content of a chat-application requires a completely different strategy from the analysis of a newspaper application for determining the context of such view of the application.

As a chat application typically comprises a plurality of messages potentially expressing emotions giving context information e.g. on the involved parties the text of all messages can be analyzed to determine context information such as such as the emotional content of the discussion (positive, negative, . . . ), a general category to which the discussion relates (Car, Travel, . . . ) as well as keywords (Florida, Audi, . . . )

Contrary to such a chat application, a newspaper application there is no user text that can be analyzed for determination a context of a user. In case of such newspaper application the emotion of the respective article could be determined by analyzing the text of the article for determining the content of the article and furthermore based on the time the user is looking at the article determine the emotion of the user with respect to the content of the respective article.

It is clear from the former examples of applications that based on the type of application a different strategy may be necessary for determining the context.

The basic idea of these strategies is that our technology creates value by analyzing the content that is associated with a view. This analysis of this content involves various natural language processing methods such as sentiment analysis, categorization, etc. This semantic analysis allows us, for example in the case of the application of news, to analyze the nature of certain adjectives in the article's text to determine the emotional content of its content. It also allows us at first to associate the text of the article with a generic category: politics, economics etc. Beyond semantic analysis, we can also extract keywords from the text: Boris Johnson, Brexit, etc.

However, to do this we must first determine the relevant part of the text to which the semantic analysis relates. In the case of the current application, this involves analyzing the text of the article including the actual content of the article and hence not considering the text containing the author's name or publication date or a generic text unrelated to the content of the article consulted by the user.

Similarly, in case of an instant messaging application, it is a question of analyzing the text of the last messages and not the text containing the time and date of the message or the names of the various in the chat involved correspondents.

In order to select the context of the application the relevant text is to determine by means of a strategy dedicated to each type of application. In case of a newspaper application an analysis is performed on only the three longest texts fragments (i.e. those with the most characters) and then, on the basis of these first results, to restrict the analysis to a single text.

In the case of an instant messaging application, the strategy is different, as it only consists of analyzing only the text of variables that contain a threshold value of text characters (for example, at least 80% text characters) (to avoid elements describing dates or times) and whose text variance is, between two refresh steps, greater than a threshold value (to avoid generic elements such as a user name, . . . )

In this way the dedicated strategy for analyzing the content of sais view of the subject application is tailored to the type of application by optimum selecting the relevant information based on which the context can be determined.

Additionally, meta-information associated with said application corresponding to said view is retrieved where the retrieved meta-information even better characterizes the application and the context thereof. This metadata may include information such as: the language of the user's system, the location of the user, the time of arrival and departure on the view of the application. This meta-data as an example may allow for instance various applications: such as serving contextualized advertising in Dutch to a Dutch-speaking user and in French to a French-speaking user, as part of an analysis solution the arrival/departure times allow to determine the time spent on a view according to the context (keywords, values, categories, or emotional content).

The context information on said view of said application optionally further includes at least one of said type of application determined and meta-information associated with said application retrieved is collected. This context information can be applied for putting the context of the view of the application into a certain perspective and could for example be applied in content suggestion for this respective user, in identifying particular information (sources) that could be of relevance for the particular user while basing on the earlier determined context information and for subsequent referral to this particular identified information (sources).

Alternatively, or as an example, this information could be applicable as well in the field of advertising, the emotion that the context conveys is of particular value Imagine that a user is exposed to content dealing with the autonomy constraints of electric vehicles. This technology is able to associate, to this content, a category (the automobile) of keywords (autonomy . . . ) and an emotion (negative). This is for instance to allow an automobile firm such as BMW to adapt or calibrate its advertising message by offering ads, e.g. to change the opinion, emotion, related to its improved range of hybrid cars or proving its fast charging system. The contextual analysis allows to capitalize on the context of an application to generate growth or increase retention of a user base. The concept automatically identifies the emotion, keywords, category or value taken by the content of a particular view, or variable and determines how these factors affect the user's behavior (for example: what context does lead the user to leave a view of an application and moving to another).

The contextual analysis by means of the analysis device then offers means to react, for example by changing the value of a variable or by sending separate notifications to user groups with common reactions to a given context).

Hence it is facilitated to capitalize on the context information on a view of an application which is gathered to indicate that reading an article with a negative emotional content in the political category with the key "brexit" was likely to cause an abandonment rate (or a commitment rate such as time spent on a view) 30% higher than the average. This analysis can also be completed by the meta-data described above: The abandonment rate following the visualization of the target content described above (negative article on Brexit) increases by 35% in Brussels but only by 20% in Antwerp, . . . ).

Furthermore, the context information on said application corresponding to said view may be forwarded to a server device 2 that in turn determines alternative contentment based on said context information on said application corresponding to said view.

The receiving server 2 is configured to, based on said context information on said view of said application, optionally including at least one of said type of application determined and meta-information associated with said application retrieved is collected, identify particular alternative information (—sources) that could be of relevance for the particular user while for subsequent referral to this particular identified information (—sources).

Alternatively, or as an example, this information could be applicable as well in the field of advertising, the emotion that the context conveys is of particular value Imagine that a user is exposed to content dealing with the autonomy constraints of electric vehicles. Our technology is able to associate, to this content, a category (the automobile) of keywords (autonomy . . . ) and an emotion (negative). This is for instance to allow an automobile firm such as BMW to calibrate its advertising message by offering ads, e.g. to change the opinion, emotion, related to its improved range of hybrid cars or proving its fast charging system.

Alternatively, or additionally, there could be applied privacy rules on said context information on said view of said application that optionally may including at least one of said type of application determined and meta-information associated with said application retrieved, where this applying means filtering the context information and results that are based on this context information in so far that privacy of the user computing device is respected.

What is claimed is:

1. A method for extracting data associated with a view of an application from a plurality of applications, the application being executed by a mobile computing device and the view of the application being displayed at a display of the mobile computing device, wherein the method comprises the steps of:
retrieving a variable data set associated with the view of the application from a memory of the mobile computing device, the variable data set comprising at least one data element being defined by a variable type and a variable with a corresponding value, the at least one data element of the variable data set characterizes the view of the application; and
assigning a cluster to each of the at least one data element of the variable data set based on the variable type, the variable with corresponding value and a predefined set of clusters; and
determining the type of application based on the cluster assigned to each of the at least one data element of the variable data set.

2. The method for extracting data from the view of the application according to claim 1, wherein the method further comprises the step of:
determining a strategy for analyzing the content of the view of the application based on the type of application.

3. The method for extracting data from the view of the application according to claim 2, wherein the method further comprises the step of:
determining information on the context on the view of the application based on the strategy for analyzing the content of the view of the application.

4. The method for extracting data from the view of the application according to claim 3, wherein the method further comprises the step of:
forwarding the context information on the application corresponding to the view to a server device that is configured to determine alternative content based on the context information on the application corresponding to the view.

5. The method for extracting data from the view of the application according to claim 3, wherein the method further comprises the step of:
collecting context information on the view of the application optionally including at least one of the type of application determined and meta-information associated with the application retrieved.

6. The method for extracting data from the view of the application according to claim 2, wherein the method further comprises the step of:
collecting context information on the view of the application optionally including at least one of the type of application determined and meta-information associated with the application retrieved.

7. The method for extracting data from the view of the application according to claim 5, wherein the method further comprises the step of:
applying privacy rules on the context information on the view of the application optionally including at least one of the type of application determined and meta-information associated with the application retrieved.

8. The method for extracting data from the view of the application according to claim 7, wherein the method further comprises the step of:
forwarding the context information on the application corresponding to the view to a server device that is configured to determine alternative content based on the context information on the application corresponding to the view.

9. The method for extracting data from the view of the application according to claim 6, wherein the method further comprises the step of:
forwarding the context information on the application corresponding to the view to a server device that is configured to determine alternative content based on the context information on the application corresponding to the view.

10. The method for extracting data from the view of the application according to claim 2, wherein the method further comprises the step of:
retrieving meta-information associated with the application corresponding to the view.

11. The method for extracting data from the view of the application according to claim 1, wherein the method further comprises the step of:
retrieving meta-information associated with the application corresponding to the view.

12. The method for extracting data from the view of the application according to claim 11, wherein the method further comprises the step of:
forwarding the context information on the application corresponding to the view to a server device that is configured to determine alternative content based on the context information on the application corresponding to the view.

13. The method for extracting data from a view of an application according to claim 1, wherein the predefined set of clusters is based on the type of applications of the plurality of applications being viewed.

14. An analysis device for extracting data associated with a view of an application from a plurality of applications, the application being executed by a mobile computing device and the view of the application being displayed at a display of the mobile computing device, wherein the analysis device is configured to:
retrieve a variable data set associated with the view of the application from a memory of the mobile device, the variable data set comprising at least one data element being defined by a variable type and a variable with a corresponding value, the at least one data element of the variable data set characterizes the view of the application; and
assign a cluster to each of the at least one data element of the of the variable data set based on the variable type, the variable with corresponding value and a predefined set of clusters; and
determine the type of application based on the cluster assigned to each of the at least one data element of the of the variable data set.

15. The analysis device for extracting data associated with the view of the application according to claim 14, wherein the analysis device is further configured to forward the context information on the application corresponding to the view to a server device that is configured to determine alternative content based on the context information on the application corresponding to the view.

16. A mobile computing device for extracting data associated with a view of an application from a plurality of applications the application being executed by the mobile device and the view of the application being displayed at a display (DP) of the mobile computing device, wherein the mobile computing device further comprises an analysis device according to claim 14.

17. A mobile computing device for extracting data associated with a view of an application from a plurality of applications the application being executed by the mobile device and the view of the application being displayed at a display (DP) of the mobile computing device, wherein the mobile computing device further comprises an analysis device for extracting data associated with a view of an application from a plurality of applications, the application being executed by a mobile computing device and the view of the application being displayed at a display of the mobile computing device, wherein the analysis device is configured to:

retrieve a variable data set associated with the view of the application from a memory of the mobile device, the variable data set comprising at least one data element being defined by a variable type and a variable with a corresponding value, the at least one data element of the variable data set characterizes the view of the application; and assign a cluster to each of the at least one data element of the of the variable data set based on the variable type, the variable with corresponding value and a predefined set of clusters; and determine the type of application based on the cluster assigned to each of the at least one data element of the of the variable data set.

* * * * *